United States Patent
Nam et al.

(10) Patent No.: US 11,997,514 B2
(45) Date of Patent: May 28, 2024

(54) DETERMINATION OF UE-SPECIFIC PDCCH MONITORING OCCASIONS

(71) Applicant: QUALCOMM Incorporated, San Diego, CA (US)

(72) Inventors: Wooseok Nam, San Diego, CA (US); Tao Luo, San Diego, CA (US); Jing Sun, San Diego, CA (US); Xiaoxia Zhang, San Diego, CA (US); Zhifei Fan, San Diego, CA (US); Qingjiang Tian, San Diego, CA (US); Ahmed Abdelaziz Ibrahim Abdelaziz Zewail, San Diego, CA (US); Vinay Chande, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 519 days.

(21) Appl. No.: 17/232,067

(22) Filed: Apr. 15, 2021

(65) Prior Publication Data
US 2022/0338035 A1    Oct. 20, 2022

(51) Int. Cl.
*H04W 24/08*     (2009.01)
*H04B 7/06*      (2006.01)
(Continued)

(52) U.S. Cl.
CPC .......... *H04W 24/08* (2013.01); *H04B 7/0626* (2013.01); *H04L 5/0051* (2013.01);
(Continued)

(58) Field of Classification Search
None
See application file for complete search history.

(56) References Cited

U.S. PATENT DOCUMENTS

2020/0295457 A1* 9/2020 Yasuo ................ H01Q 3/44
2020/0374967 A1 11/2020 Nogami et al.
(Continued)

FOREIGN PATENT DOCUMENTS

KR    1020227020475    *  3/2020
KR    1020210039170    *  3/2021
WO    2021066198 A1    4/2021

OTHER PUBLICATIONS

Author Unknown, Discussion on TBS determination in MPDCCH CSS/USS, pp. 1-2, Doc No. R1-1902953, Mar. 1 (Year: 2019).*
(Continued)

*Primary Examiner* — Christopher M Crutchfield
(74) *Attorney, Agent, or Firm* — Procopio, Cory, Hargreaves & Savitch LLP

(57) ABSTRACT

A method, a computer-readable medium, and an apparatus are disclosed. The apparatus may be a UE. The apparatus may transmit, to a base station, an indication of a UE capability for PDCCH monitoring. The apparatus may configure, based on the UE capability for PDCCH monitoring, first MOs of a USS set to align with second MOs of a CSS set. The apparatus may monitor, based on the configuration, for a plurality of PDCCHs during PDCCH MOs. The PDCCH MOs may correspond to the first MOs or the second MOs. The first MOs of the USS set may be adjusted dynamically to be in same slots as the second MOs of the CSS set or to be within a predefined range of the second MOs of the CSS set.

9 Claims, 12 Drawing Sheets

(51) Int. Cl.

| | |
|---|---|
| *H04L 5/00* | (2006.01) |
| *H04W 56/00* | (2009.01) |
| *H04W 72/0446* | (2023.01) |
| *H04W 72/0453* | (2023.01) |
| *H04W 72/23* | (2023.01) |
| *H04W 72/53* | (2023.01) |
| *H04W 80/02* | (2009.01) |

(52) U.S. Cl.
CPC ..... *H04W 56/001* (2013.01); *H04W 72/0446* (2013.01); *H04W 72/0453* (2013.01); *H04W 72/23* (2023.01); *H04W 72/53* (2023.01); *H04W 80/02* (2013.01)

(56) References Cited

U.S. PATENT DOCUMENTS

| | | | | |
|---|---|---|---|---|
| 2021/0195653 A1* | 6/2021 | Lei | .......... | H04L 5/0094 |
| 2022/0240160 A1* | 7/2022 | Jang | .......... | H04W 48/12 |
| 2022/0255700 A1* | 8/2022 | Jang | .......... | H04L 5/0053 |
| 2022/0322245 A1* | 10/2022 | Park | .......... | H04W 52/365 |
| 2022/0360420 A1* | 11/2022 | Sun | .......... | H04W 72/542 |
| 2023/0069777 A1* | 3/2023 | Chung | .......... | H04L 5/0053 |

OTHER PUBLICATIONS

International Search Report and Written Opinion—PCT/US2022/023687—ISA/EPO—dated Aug. 1, 2022.

PCMCC: "Remaining Issues on Inter UE Tx prioritization/Multiplexing", 3GPP Draft, 3GPP TSG RAN WG1 #100, R1-2000753, 3rd Generation Partnership Project (3GPP), Mobile Competence Centre, 650, Route Des Lucioles, F-06921 Sophia-Antipolis Cedex, Franc vol. RAN WG1, No. e-Meeting, Feb. 24, 2020-Mar. 6, 2020, Feb. 14, 2020 (Feb. 14, 2020), XP051853035, 4 Pages.

Samsung: "Summary of Other System Information Delivery", 3GPP Draft, 3GPP TSG RAN WG1 Meeting #94bis, R1-1811804, NR OSI Summary, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Oct. 9, 2018 (Oct. 9, 2018), XP051519131, 9 Pages.

* cited by examiner

DETERMINATION OF UE-SPECIFIC PDCCH MONITORING OCCASIONS

BACKGROUND

Technical Field

The present disclosure relates generally to communication systems, and more particularly, to alignment of physical downlink control channel (PDCCH) monitoring occasions in different search space sets.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may transmit, to a base station, an indication of a UE capability for PDCCH monitoring. The apparatus may configure, based on the UE capability for PDCCH monitoring, first monitoring occasions (MOs) of a UE-specific search space (USS) set to align with second MOs of a common search space (CSS) set. The apparatus may monitor, based on the configuration, for a plurality of PDCCHs during PDCCH MOs. The PDCCH MOs may correspond to the first MOs or the second MOs.

In an aspect of the disclosure, a method, a computer-readable medium, and an apparatus are provided. The apparatus may be a base station. The apparatus may receive, from a UE, an indication of a UE capability for PDCCH monitoring. The apparatus may configure PDCCH transmission occasions based on the UE capability for PDCCH monitoring. The apparatus may transmit, to the UE, a plurality of PDCCHs during PDCCH MOs. The PDCCH MOs may correspond to first MOs of a USS set or second MOs of a CSS set. The first MOs of the USS set may be aligned with the second MOs of the CSS set.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
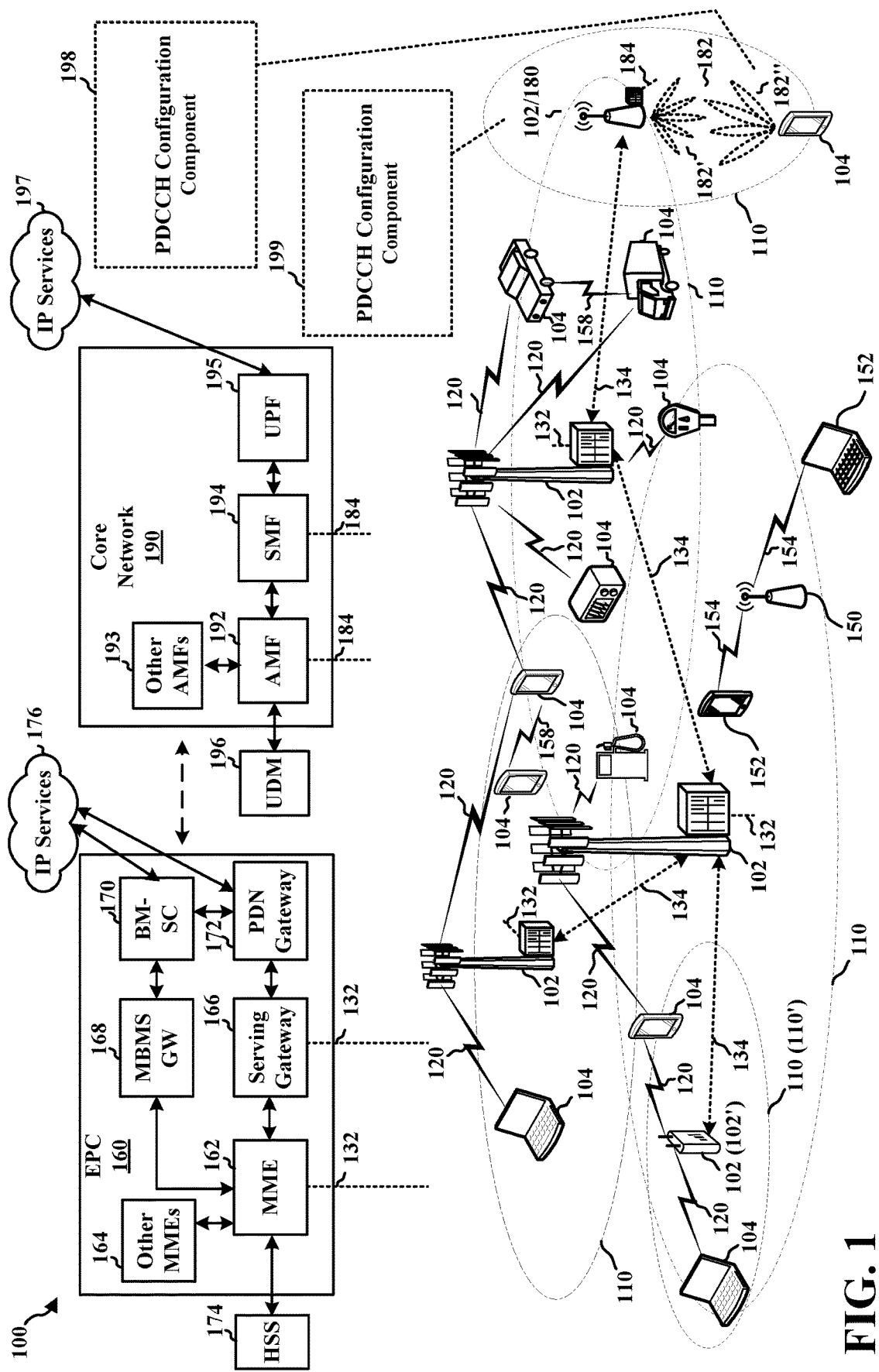
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a PDCCH configuration component 198 that may be configured to transmit, to a base station, an indication of a UE capability for PDCCH monitoring. The PDCCH configuration component 198 may be configured to configure, based on the UE capability for PDCCH monitoring, first MOs of a USS set to align with second MOs of a CSS set. The PDCCH configuration component 198 may be configured to monitor, based on the configuration, for a plurality of PDCCHs during PDCCH MOs. The PDCCH MOs may correspond to the first MOs or the second MOs. In certain aspects, the base station 180 may include a PDCCH configuration component 199 that may be configured to receive, from a UE, an indication of a UE capability for PDCCH monitoring. The PDCCH configuration component 199 may be configured to configure PDCCH transmission occasions based on the UE capability for PDCCH monitoring. The PDCCH configuration component 199 may be configured to transmit, to the UE, a plurality of PDCCHs during PDCCH MOs. The PDCCH MOs may correspond to first MOs of a US S set or second MOs of a CSS set. The first MOs of the USS set may be aligned with the second MOs of the CSS set. Although the following description may be focused on 5G NR, the concepts described herein may be applicable to other similar areas, such as LTE, LTE-A, CDMA, GSM, and other wireless technologies.

Figure 2:
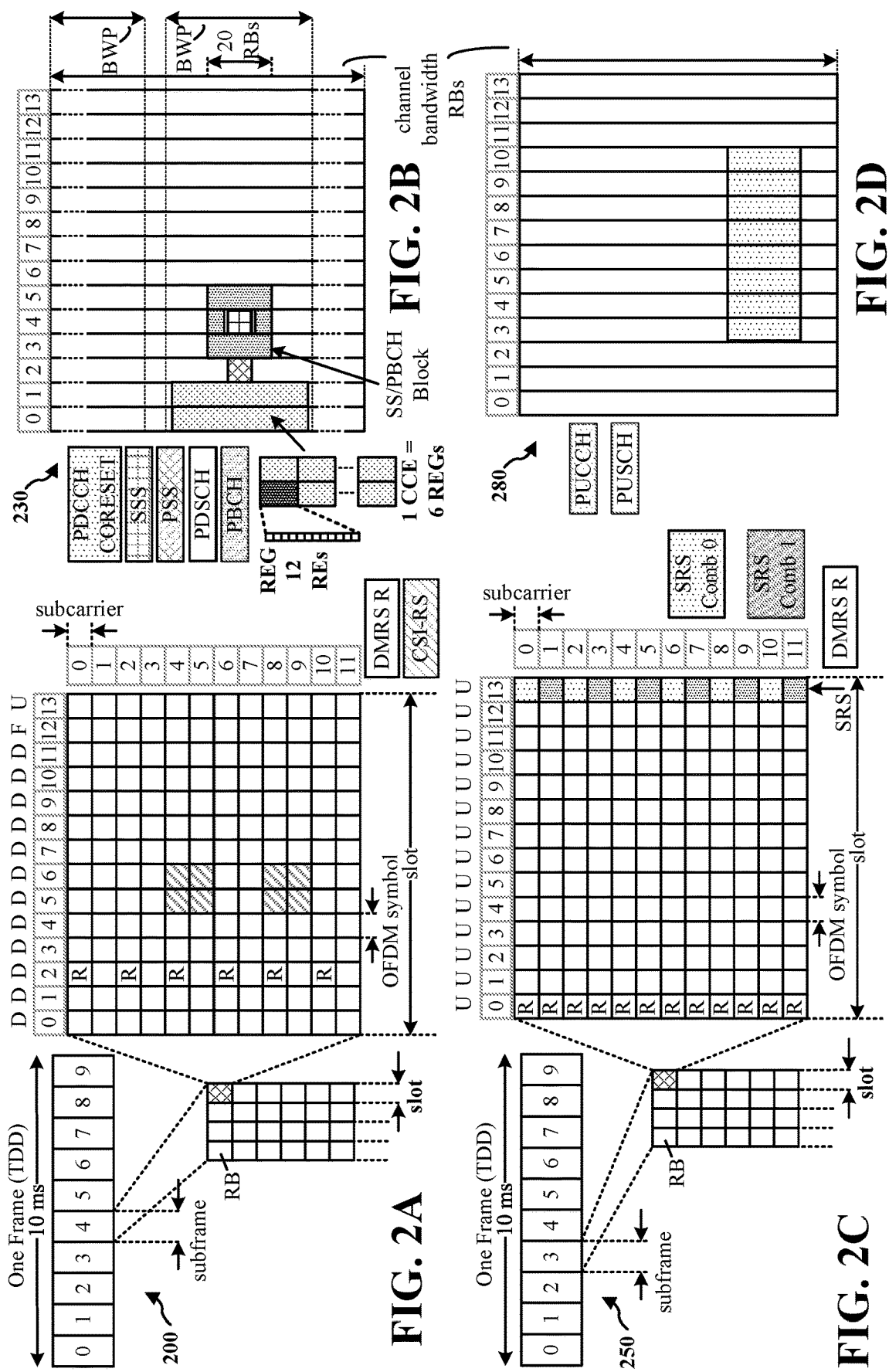
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
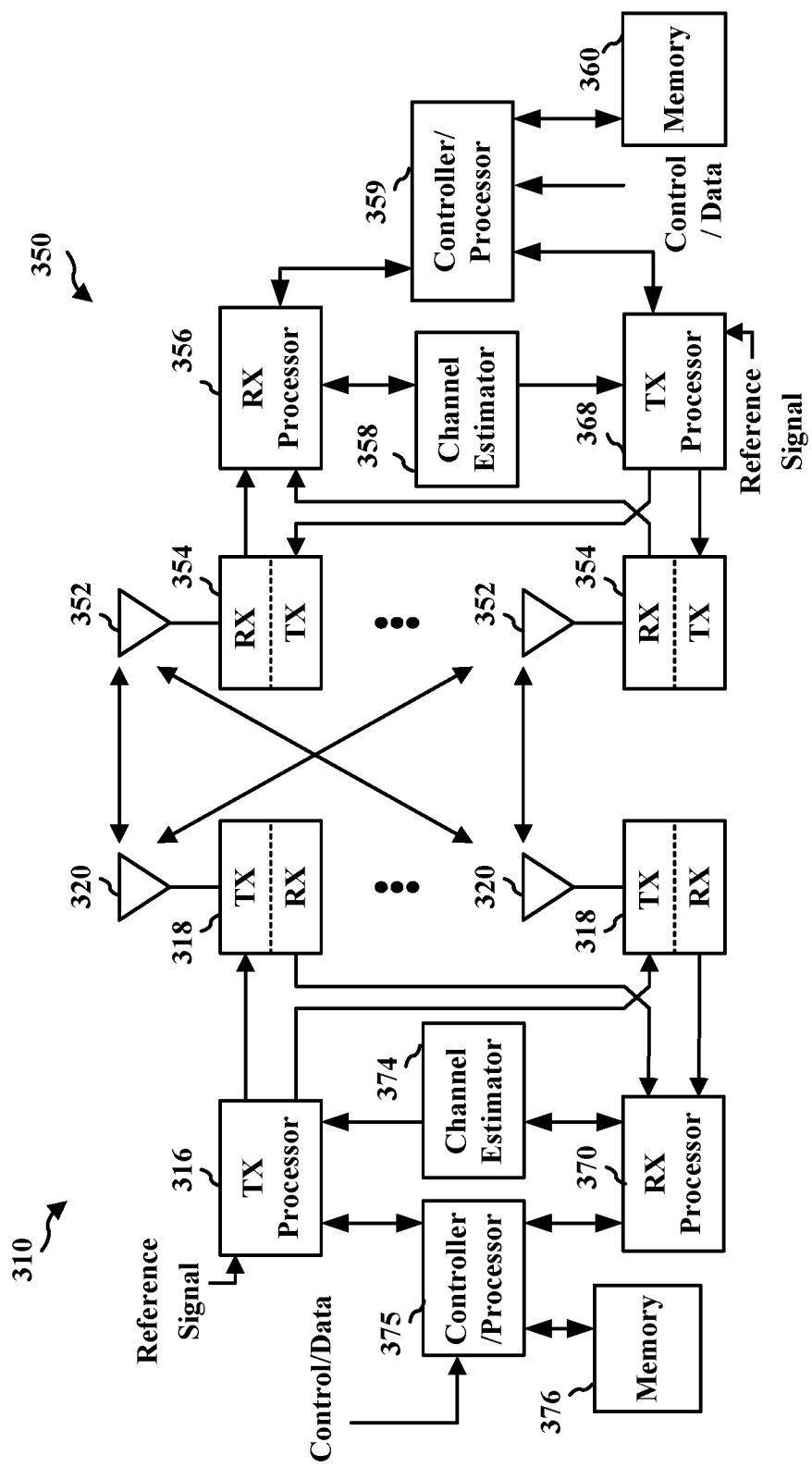
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4B:
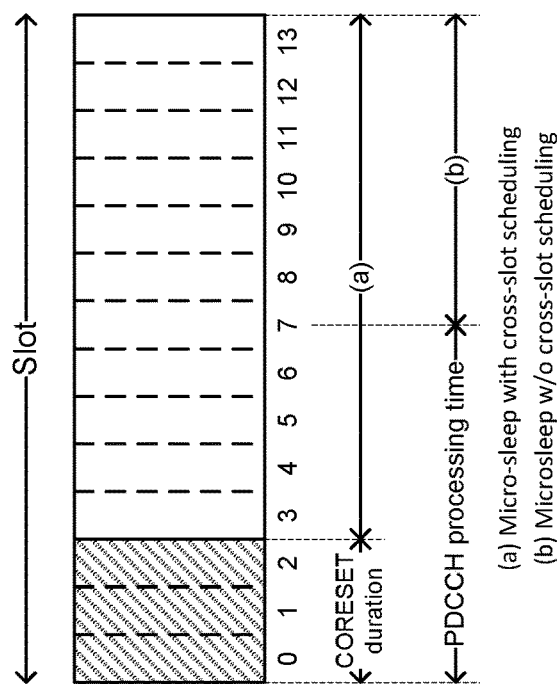
FIG. 4B is a diagram illustrating the micro-sleep technique.
Figure 4A:
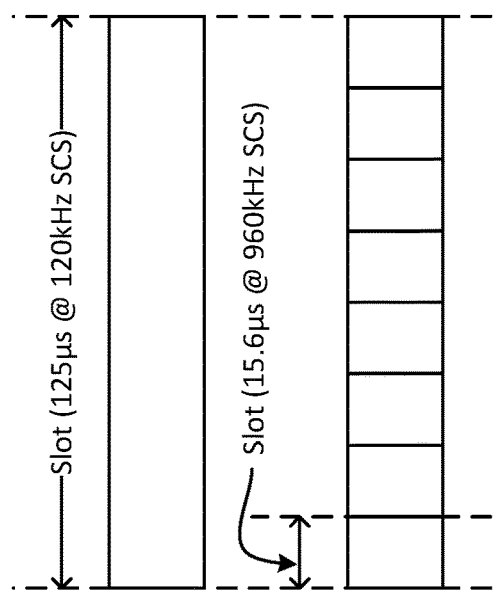
FIG. 4A is a diagram illustrating different slot lengths at different SCSs.

For wireless communication applications, e.g., NR applications, with higher carrier bands/frequencies (e.g., FR2x/FR4 (52.6 GHz-114.25 GHz)), an OFDM waveform with a large subcarrier spacing (SCS) (e.g., 240 kHz-1.92 MHz) may be utilized to combat substantial phase noise and to fill up a large bandwidth (e.g., a bandwidth that is approximately 2 GHz). Due to the large SCS, the slot length may be short. FIG. 4A is a diagram 400A illustrating different slot lengths at different SCSs. For example, as illustrated in FIG. 4A, in FR2 with a 120 kHz SCS, the slot length may be 125 microseconds (μs), while in FR4 with a 960 kHz SCS, the slot length may be 15.6 μs. With a reduction in the slot length by a certain factor, e.g., a factor of 8, the processing capability may need to be increased to complete the same processing promptly. To increase the processing capability, the clock speed may be increased or more hardware components may be provided to parallelize the processing. Both solutions may be associated with an increased hardware implementation complexity that is potentially infeasible. In other words, due to the limit on the implementation complexity, the device's processing timeline (e.g., for control and/or data processing) may not proportionally scale with the slot length. FIG. 4B is a diagram 400B illustrating a micro-sleep technique. The RF frontend and baseband processing may be powered down during the micro-sleep period. As illustrated in FIG. 4B, even with same-slot scheduling, the power saving benefit of the micro-sleep technique may be achieved in FR1/FR2. However, in FR4, the time utilized for the control channel processing may be comparable to or overrun the slot length and, as a result, micro-sleep may not be possible. Further, in FR1/FR2, the UE may be configured to monitor for the PDCCH in every slot. However, in FR4, due to the limited processing capability, the minimum PDCCH monitoring periodicity supported by a UE may be greater than one slot.

In some aspects of wireless communication, e.g., NR, different types of PDCCH common search space (CSS) sets may be defined. A UE may monitor CSS sets to receive broadcast or common messages from the base station during the connected mode operation, as well as during the idle or inactive mode operation. A PDCCH monitoring occasion (MO) of a CSS set may be associated with an SSB, in terms of the quasi co-location (QCL) assumption. PDCCHs in CSS sets may be repeated in multiple MOs associated with different SSBs (e.g., PDCCHs may be transmitted on different beams with different QCL relationships with different SSBs). Based on an SSB measurement (e.g., a reference signal receiver power (RSRP) measurement), the UE may determine which MOs to monitor. Examples of common PDCCHs and CSS sets may include the PDCCH scheduling the SIB 1, the PDCCH scheduling other SIBs, the PDCCH scheduling a message 2 (Msg2) or message B (MsgB), or the PDCCH scheduling paging. For the PDCCH scheduling the SIB 1, the UE may monitor a Type0-PDCCH CSS set (which may be configured in the MIB) in a window of two consecutive slots (for SSB and CORESET multiplexing pattern 1) associated with an SSB. For the PDCCH scheduling other SIBs, when the Type0A-PDCCH CSS set (which may be configured in the SIB 1) is set to zero, the UE may monitor the same search space set as the Type0-PDCCH CSS set in a system information (SI)-window. For the PDCCH scheduling a Msg2 or MsgB, when the Type1-PDCCH CSS set (which may be configured in the SIB 1) is set to zero, the UE may monitor the same search space set as the Type0-PDCCH CSS set in a random access response (RAR)- window. For the PDCCH scheduling paging, when the Type2-PDCCH CSS set (which may be configured in the SIB 1) is set to zero, the UE may monitor the same search space set as the Type0-PDCCH CSS set in a paging occasion (PO).

For higher SCSs (e.g., 480 kHz and 960 kHz), due to the challenges associated with processing PDCCHs in a short slot duration, as described above, a multi-slot based PDCCH monitoring capability may be utilized. Based on the multi-slot based PDCCH monitoring, the PCCCH MOs may occur once every M-th slot (M>1), instead of every slot. The supported value(s) of M may be based on the UE capability, and the base station may configure PDCCH search spaces for the UE based on the UE capability reporting. For example, the UE may report to the base station a capability of monitoring the PDCCHs once every N slots, and accordingly the base station may configure the PDCCH search space sets for the UE so that the UE monitors the PDCCH once every M slots, where M is greater than or equal to N.

Figure 5:
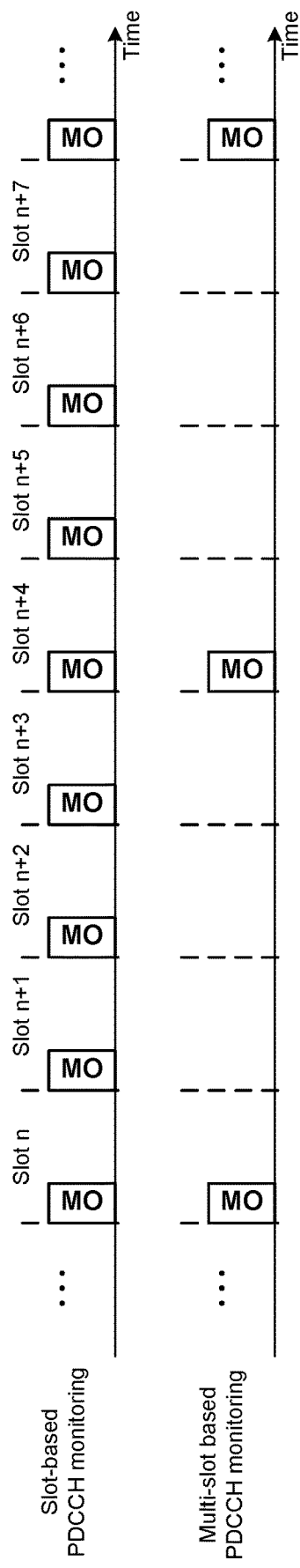
FIG. 5 is a diagram illustrating slot-based PDCCH monitoring and multi-slot-based PDCCH monitoring.

FIG. 5 is a diagram 500 illustrating slot-based PDCCH monitoring and multi-slot-based PDCCH monitoring. As illustrated in FIG. 5, with the slot-based PDCCH monitoring, the PDCCH MOs may occur in every slot. In other words, the UE may monitor for the PDCCHs in every slot. On the other hand, with the multi-slot-based PDCCH monitoring, the PDCCH MOs may occur once every M-th slot (e.g., M=4 in FIG. 5). In other words, the UE may monitor for the PDCCHs once every M slots (e.g., once every four slots in FIG. 5).

Figure 6:
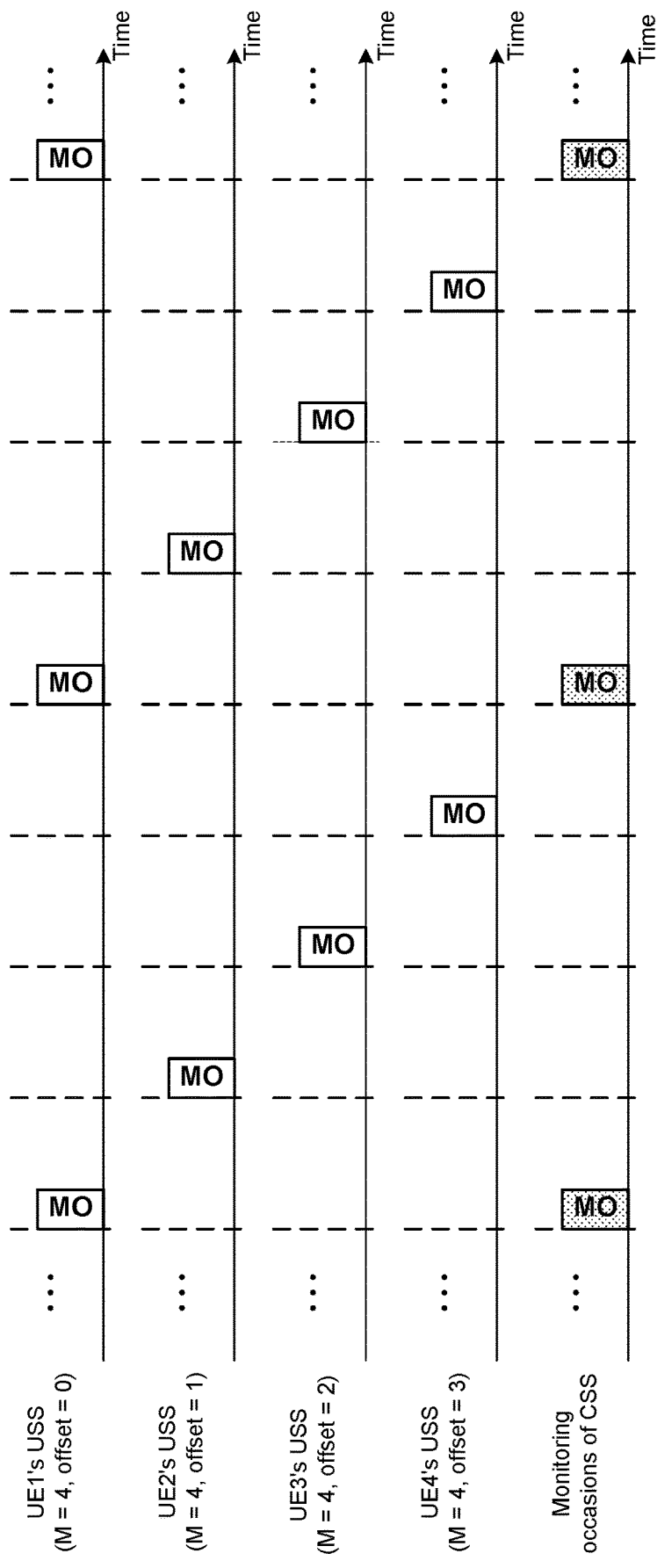
FIG. 6 is a diagram illustrating staggered PDCCH MOs of USS sets for four UEs.

When multiple UEs served by a base station support multi-slot based PDCCH monitoring, the base station may configure different UE's PDCCH MOs in a staggered manner, to avoid congestion in the control channels. Although USS sets may be distributed by staggering, CSS sets may not be distributed. FIG. 6 is a diagram 600 illustrating staggered PDCCH MOs of USS sets for four UEs. With different offset values, the first, the second, the third, and the fourth UEs are configured with staggered MOs of USS sets, and congestion in the control channels may be avoided. However, as illustrated in FIG. 6, with the exception of the first UE, the other UEs may need to separately monitor two sets of PDCCH occasions (one for the respective USS set, the other for the CSS set). This may lead to increased complexity and power consumption.

In one aspect, MOs of a USS set for a UE may be changed dynamically to be in the same slots as the MOs of the CSS set, or be at least within a certain range of the MOs of the CSS set. The MOs of a USS set may be determined based on the periodicity and the offset configuration (e.g., in the SS set configuration). In some aspects, the parameters defining the MOs of a USS set, including the periodicity, the offset, and the CORESET frequency domain resources, may be modified. The periodicity (which may be part of the SS set configuration) of the MOs of the USS set may be modified or restricted so as to divide the periodicity of the MOs of the CSS set. For example, if the periodicity of the MOs of the CSS set is L slots, the periodicity of the MOs of the USS set may be an integer value given by L/K, where K is another positive integer. The offset (e.g., a time shift relative to system frame number) of the MOs of the USS set may be modified so that the MOs of the USS set may be in the same slots as the MOs of the CSS set, or be within a certain range of the MOs of the CSS set. In one configuration, if the CORESET frequency domain resources (which may be part of the CORESET configuration) associated with the USS set overlap with the CORESET frequency domain resources associated with the CSS set, the CORESET frequency domain resources associated with the USS set may be modified (e.g., through a frequency shift) to avoid overlapping in frequency of CORESET resources. Alternatively, in another configuration, the CORESET frequency domain resources associated with the USS set may be modified to overlap with the CORESET frequency domain resources associated with the CSS set (i.e., CORESETs #0) to reduce the number of control channel elements (CCEs) that may need to be monitored. Further, the transmission configuration indicator (TCI) state of the CORESET associated with the USS set may be modified to use the same beam (e.g., the same QCL assumption) as that of the CORESET associated with the CSS set. The MOs of a USS set may be configured on a per-UE, per-band, per-component carrier (CC), per-BWP, per-CORESET, or per-SS set configuration basis. The UE may include the configurability of the MOs of the USS set in the UE capability report.

Figure 7:
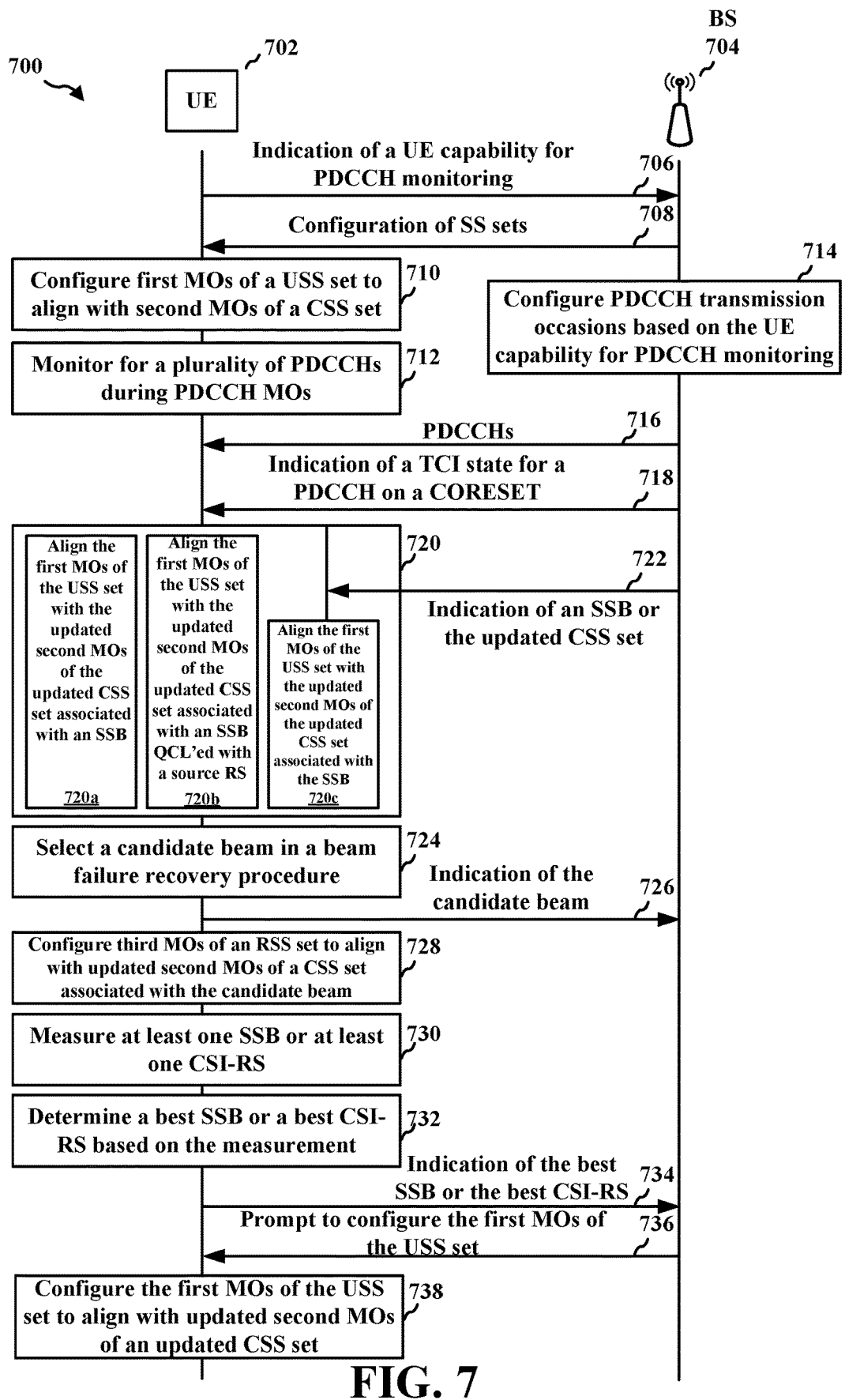
FIG. 7 is a communication flow diagram of a method of wireless communication.

FIG. 7 is a communication flow diagram 700 of a method of wireless communication. At 706, the UE 702 may transmit to the base station 704, and the base station 704 may receive from the UE 702, an indication of a UE capability for PDCCH monitoring.

At 708, the base station 704 may transmit to the UE 702, and the UE 702 may receive from the base station 704, a configuration of PDCCH search space sets for the UE 702 based on the UE capability for PDCCH monitoring.

At 710, the UE 702 may configure, based on the UE capability for PDCCH monitoring, first MOs of a USS set to align with second MOs of a CSS set. The first MOs of the USS set may be adjusted dynamically to be in same slots as the second MOs of the CSS set, or to be within a predefined range of the second MOs of the CSS set. The first MOs of the USS set may correspond to same CORESETs as the second MOs of the CSS, or to CORESETs that are different from but overlap in time with CORESETs to which the second MOs of the CSS set correspond.

Figure 8A:
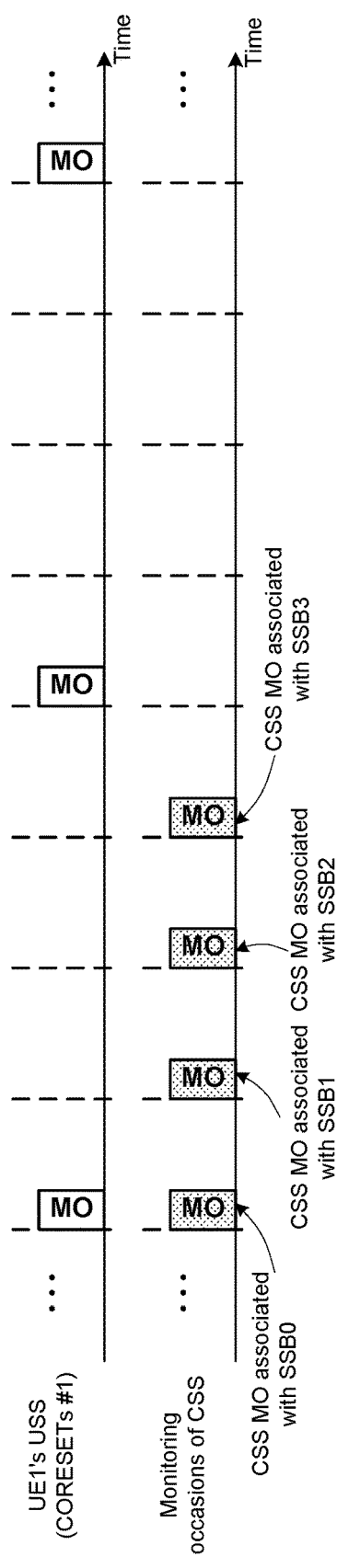
FIG. 8A is a diagram illustrating alignment of the MOs of the USS set with the MOs of the CSS set.

Referring to FIG. 8A, a diagram 800A illustrating alignment of the MOs of the USS set with the MOs of the CSS set is shown. As illustrated in FIG. 8A, the USS set of the UE may be associated with CORESETs #1, and the TCI state of the CORESETs #1 may have the SSB, i.e., SSB0, as the QCL-TypeD source. Accordingly, the MOs of the USS set may be aligned with the MOs of the CSS set associated with the SSB, i.e., SSB0.

Referring back to FIG. 7, at 712, the UE 702 may monitor, based on the configuration, for a plurality of PDCCHs during PDCCH MOs. The PDCCH MOs may correspond to the first MOs or the second MOs. The PDCCH MOs may occur once every M slots, where M>1.

At 714, the base station 704 may configure PDCCH transmission occasions based on the UE capability for PDCCH monitoring.

At 716, the base station 704 may transmit to the UE 702, and the UE 702 may receive from the base station 704, a plurality of PDCCHs during PDCCH MOs. The PDCCH MOs may correspond to first MOs of a USS set or second MOs of a CSS set. The first MOs of the USS set may be aligned with the second MOs of the CSS set.

In one configuration, the UE 702 may receive a media access control (MAC)-control element (CE) (MAC-CE) for a PDCCH TCI state indication for a CORESET. Accordingly, at 718, the base station 704 may transmit to the UE 702, and the UE 702 may receive from the base station 704, an indication of a TCI state for a PDCCH on a CORESET to which updated second MOs of an updated CSS set correspond. In one configuration, the indication may be received via a media access control (MAC)-control element (CE) (MAC-CE). In one configuration, the UE 702 may modify parameters of the CORESET and the search space sets associated with the CORESET. Accordingly, at 720, the indication may prompt the UE 702 to adjust at least one parameter of CORESETs to which the first MOs of the USS set correspond or at least one parameter of the USS set to align the first MOs of the USS set with the updated second MOs of the updated CSS set.

In one configuration, if the indicated TCI state contains a QCL-TypeD parameter, and the source reference signal (RS) of the TCI state is an SSB, the MOs of the USS set may be aligned with the MOs of the CSS set associated with the SSB. Accordingly, at 720*a*, the UE 702 may align the first MOs of the USS set with the updated second MOs of the updated CSS set associated with an SSB. The first MOs of the USS set may be aligned with the updated second MOs of the updated CSS set in response to the TCI state including a QCL-TypeD parameter and a source RS of the TCI state being the SSB.

Figure 8B:
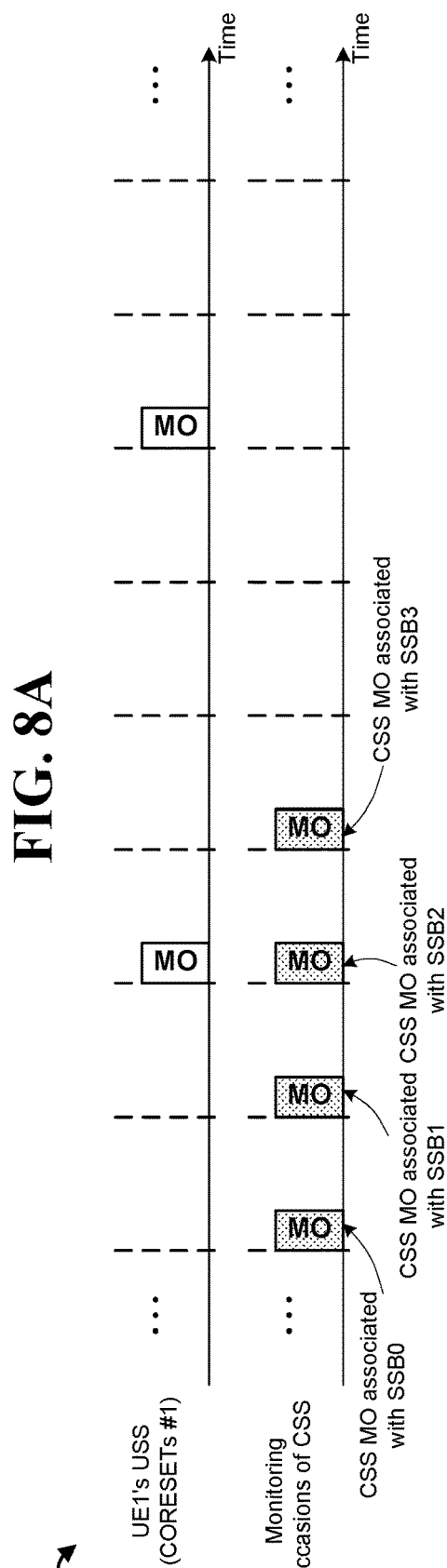
FIG. 8B is a diagram illustrating alignment of the MOs of the USS set with the MOs of the CSS set.

Referring to FIG. 8B, a diagram 800B illustrating alignment of the MOs of the USS set with the MOs of the CSS set is shown. The UE 702 may receive a MAC-CE from the base station 704 indicating a new TCI state of the CORESETs #1 (which are associated with the MOs of the USS set). The new TCI state of the CORESETs #1 may have the SSB, i.e., SSB2, as the QCL-TypeD source. Accordingly, the UE 702 may adjust the parameters (e.g., the offset of MOs) of the USS set to align the MOs of the USS set with the new/updated MOs of the new/updated CSS set (i.e., the CSS set associated with the SSB, i.e., SSB2).

Referring back to FIG. 7, in one configuration, if the indicated TCI state contains a QCL-TypeD parameter, and the source RS is a not an SSB (e.g., the source RS may be a CSI-RS or a tracking reference signal "TRS"), the MOs of the USS set may be aligned with the MOs of the CSS set associated with the SSB QCL'ed with the source RS. Accordingly, at 720*b*, the UE 702 may align the first MOs of the USS set with the updated second MOs of the updated CSS set associated with an SSB QCL'ed with a source RS of the TCI state. The first MOs of the USS set may be aligned with the updated second MOs of the updated CSS set in response to the TCI state including a QCL-TypeD parameter and the source RS of the TCI state not being an SSB.

In one configuration, if the indicated TCI state does not contain a QCL-TypeD parameter (e.g., the beamforming operation may not be supported), the SSB (or the associated CSS set) that may be used to align the MOs of the USS set may be separately indicated by the same MAC-CE that conveyed the CORESET TCI state indication, or via another message (e.g., for dedicated indication signaling). For example, a DCI message, or another MAC-CE, may be utilized to indicate the SSB or the associated CSS set. Accordingly, at 722, the base station 704 may transmit to the UE 702, and the UE 702 may receive from the base station 704, an indication of the SSB or the updated CSS set associated with the SSB for alignment of the first MOs of the USS set. At 720*c*, the UE 702 may align the first MOs of the USS set with the updated second MOs of the updated CSS set associated with the SSB based on the indication of the SSB or the updated CSS set associated with the SSB.

During a beam failure recovery (BFR) procedure, the QCL assumption for monitoring the recovery search space (RSS) set may be determined by the candidate beam that the UE selects during the recovery procedure. In one configuration, when monitoring the RSS set, after indicating the selected candidate beam to the base station 704 (e.g., by sending random access channel "RACH" preamble in the RACH occasion "RO" associated with the candidate beam), the UE 702 may modify parameters of the RSS set to align the MOs of the RSS set with the MOs of the CSS set associated with the candidate beam (e.g., in particular, the SSB used as a QCL source of the candidate beam). Accordingly, at 724, the UE 702 may select a candidate beam in a beam failure recovery procedure. At 726, the UE 702 may transmit to the base station 704, and the base station 704 may receive from the UE 702, an indication of the candidate beam. At 728, the UE 702 may configure third MOs of a recovery search space (RSS) set to align with updated second MOs of a CSS set associated with the candidate beam.

In one configuration, the UE 702 may trigger a change of the MOs of the USS set. In particular, the UE 702 may measure at least one SSB and/or at least one CSI-RS and may report the index of the best SSB and/or the best CSI-RS to the base station 704. This may be achieved through CSI reporting (i.e., ssb-Index-RSRP or cri-RSRP reporting), or by other recommendation mechanisms, such as via a PUCCH, a MAC-CE, or UE assistance information feedback, etc. Based on the UE 702 reporting/recommendation, the base station 704 may indicate to the UE 702 the changes in the parameters of the MOs of the USS set. Accordingly, at 730, the UE 702 may measure at least one SSB or at least one CSI-RS. At 732, the UE 702 may determine a best or most suitable SSB or a best or most suitable CSI-RS based on the measurement. At 734, the UE 702 may transmit to the base station 704, and the base station 704 may receive from the UE 702, an indication of the best or most suitable SSB or the best or most suitable CSI-RS. At 736, the base station 704 may transmit to the UE 702, and the UE 702 may receive from the base station 704, a prompt to configure the first MOs of the USS set to align with updated second MOs of an updated CSS set based on the indication of the best or most suitable SSB or the best or most suitable CSI-RS.

In one configuration, after reporting/recommendation (e.g., at 734), the UE 702 may autonomously modify the MOs of the USS set after a certain/predefined delay. In other words, the confirmation of the modification of the MOs of the USS set by the base station 704 may be implicit and assumed after the predefined delay. Accordingly, at 738, the UE 702 may configure the first MOs of the USS set to align with updated second MOs of an updated CSS set based on the best SSB or the best CSI-RS.

Figure 9:
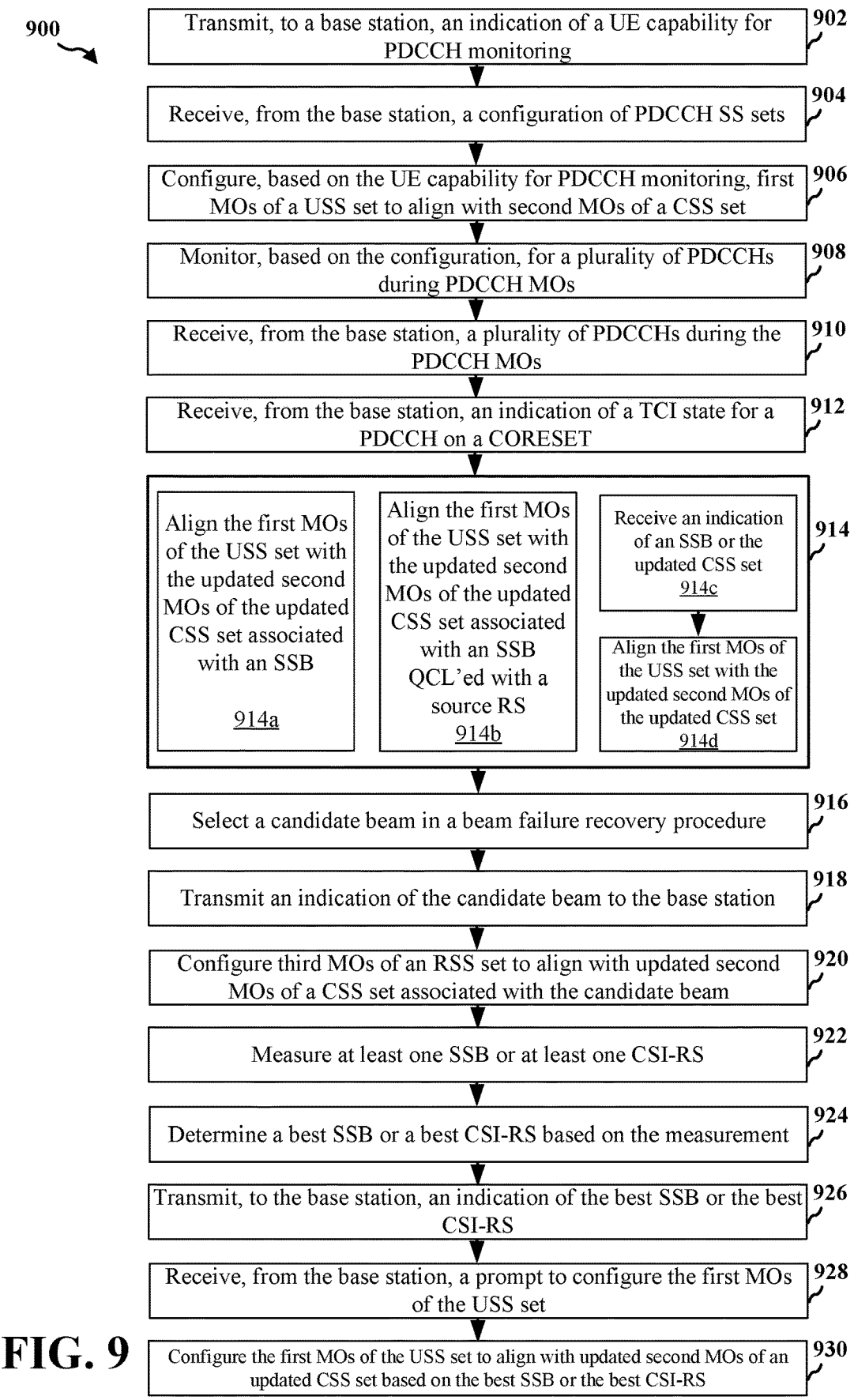
FIG. 9 is a flowchart of a method of wireless communication.

FIG. 9 is a flowchart 900 of a method of wireless communication. The method may be performed by a UE (e.g., the UE 104/350/702; the apparatus 1102). At 902, the UE may transmit, to a base station, an indication of a UE capability for PDCCH monitoring. For example, 902 may be performed by the PDCCH configuration component 1140 in FIG. 11. Referring to FIG. 7, at 706, the UE 702 may transmit, to a base station 704, an indication of a UE capability for PDCCH monitoring.

At 904, the UE may receive from the base station, a configuration of PDCCH search space sets for the UE based on the UE capability for PDCCH monitoring. For example, 904 may be performed by the PDCCH configuration component 1140 in FIG. 11. Referring to FIG. 7, at 708, the UE 702 may receive from the base station 704, a configuration of PDCCH search space sets for the UE 702 based on the UE capability for PDCCH monitoring.

At 906, the UE may configure, based on the UE capability for PDCCH monitoring, first MOs of a USS set to align with second MOs of a CSS set. For example, 906 may be performed by the PDCCH configuration component 1140 in FIG. 11. Referring to FIG. 7, at 710, the UE 702 may configure, based on the UE capability for PDCCH monitoring, first MOs of a USS set to align with second MOs of a CSS set.

At 908, the UE may monitor, based on the configuration, for a plurality of PDCCHs during PDCCH MOs. The PDCCH MOs may correspond to the first MOs or the second MOs. For example, 908 may be performed by the PDCCH configuration component 1140 in FIG. 11. Referring to FIG. 7, at 712, the UE 702 may monitor, based on the configuration, for a plurality of PDCCHs during PDCCH MOs.

At 910, the UE may receive, from the base station, a plurality of PDCCHs during PDCCH MOs. The PDCCH MOs may correspond to first MOs of a USS set or second MOs of a CSS set. The first MOs of the USS set may be aligned with the second MOs of the CSS set. For example, 910 may be performed by the PDCCH configuration component 1140 in FIG. 11. Referring to FIG. 7, at 716, the UE 702 may receive, from the base station 704, a plurality of PDCCHs during PDCCH MOs.

In one configuration, the first MOs of the USS set may be adjusted dynamically to be in same slots as the second MOs of the CSS set, or to be within a predefined range of the second MOs of the CSS set.

In one configuration, the first MOs of the USS set may correspond to same CORESETs as the second MOs of the CSS, or to CORESETs that are different from but overlap in time with CORESETs to which the second MOs of the CSS set correspond.

In one configuration, at 912, the UE may receive, from the base station, an indication of a TCI state for a PDCCH on a CORESET to which updated second MOs of an updated CSS set correspond. For example, 912 may be performed by the PDCCH configuration component 1140 in FIG. 11. Referring to FIG. 7, at 718, the UE 702 may receive, from the base station 704, an indication of a TCI state for a PDCCH on a CORESET to which updated second MOs of an updated CSS set correspond.

In one configuration, the indication may be received via a MAC-CE.

In one configuration, at 914, the indication may prompt the UE to adjust at least one parameter of CORESETs to which the first MOs of the USS set correspond or at least one parameter of the USS set to align the first MOs of the USS set with the updated second MOs of the updated CSS set.

In one configuration, at 914a, the UE may align the first MOs of the USS set with the updated second MOs of the updated CSS set associated with an SSB. The first MOs of the USS set may be aligned with the updated second MOs of the updated CSS set in response to the TCI state including a QCL-TypeD parameter and a source RS of the TCI state being the SSB. For example, 914a may be performed by the PDCCH configuration component 1140 in FIG. 11. Referring to FIG. 7, at 720a, the UE 702 may align the first MOs of the USS set with the updated second MOs of the updated CSS set associated with an SSB.

In one configuration, at 914b, the UE may align the first MOs of the USS set with the updated second MOs of the updated CSS set associated with an SSB QCL'ed with a source RS of the TCI state. The first MOs of the USS set may be aligned with the updated second MOs of the updated CSS set in response to the TCI state including a QCL-TypeD parameter and the source RS of the TCI state not being an SSB. For example, 914b may be performed by the PDCCH configuration component 1140 in FIG. 11. Referring to FIG. 7, at 720b, the UE 702 may align the first MOs of the USS set with the updated second MOs of the updated CSS set associated with an SSB QCL'ed with a source RS of the TCI state.

In one configuration, the TCI state may not include a QCL-TypeD parameter. Accordingly, at 914c, the UE may receive, from the base station, an indication of SSB or the updated CSS set associated with the SSB for alignment of the first MOs of the USS set. For example, 914c may be performed by the PDCCH configuration component 1140 in FIG. 11. Referring to FIG. 7, at 722, the UE 702 may receive, from the base station 704, an indication of SSB or the updated CSS set associated with the SSB for alignment of the first MOs of the USS. At 914d, the UE may align the first MOs of the USS set with the updated second MOs of the updated CSS set associated with the SSB based on the indication of the SSB or the updated CSS set associated with the SSB. For example, 914d may be performed by the PDCCH configuration component 1140 in FIG. 11. Referring to FIG. 7, at 720c, the UE 702 may align the first MOs of the USS set with the updated second MOs of the updated CSS set associated with the SSB based on the indication of the SSB or the updated CSS set associated with the SSB.

In one configuration, at 916, the UE may select a candidate beam in a beam failure recovery procedure. For example, 916 may be performed by the PDCCH configuration component 1140 in FIG. 11. Referring to FIG. 7, at 724, the UE 702 may select a candidate beam in a beam failure recovery procedure. At 918, the UE may transmit an indication of the candidate beam to the base station. For example, 918 may be performed by the PDCCH configuration component 1140 in FIG. 11. Referring to FIG. 7, at 726, the UE 702 may transmit an indication of the candidate beam to the base station 704. At 920, the UE may configure third MOs of an RSS set to align with updated second MOs of a CSS set associated with the candidate beam. For example, 920 may be performed by the PDCCH configuration component 1140 in FIG. 11. Referring to FIG. 7, at 728, the UE 702 may configure third MOs of an RSS set to align with updated second MOs of a CSS set associated with the candidate beam.

In one configuration, at 922, the UE may measure at least one SSB or at least one CSI-RS. For example, 922 may be performed by the PDCCH configuration component 1140 in FIG. 11. Referring to FIG. 7, at 730, the UE 702 may measure at least one SSB or at least one CSI-RS. At 924, the UE may determine a best SSB or a best CSI-RS based on the measurement. For example, 924 may be performed by the PDCCH configuration component 1140 in FIG. 11. Referring to FIG. 7, at 732, the UE 702 may determine a best SSB or a best CSI-RS based on the measurement. At 926, the UE may transmit, to the base station, an indication of the best SSB or the best CSI-RS. For example, 926 may be performed by the PDCCH configuration component 1140 in FIG. 11. Referring to FIG. 7, at 734, the UE 702 may transmit, to the base station 704, an indication of the best SSB or the best CSI-RS.

In one configuration, at 928, the UE may receive, from the base station, a prompt to configure the first MOs of the USS set to align with updated second MOs of an updated CSS set based on the indication of the best SSB or the best CSI-RS. For example, 928 may be performed by the PDCCH configuration component 1140 in FIG. 11. Referring to FIG. 7, at 736, the UE 702 may receive, from the base station 704, a prompt to configure the first MOs of the USS set to align with updated second MOs of an updated CSS set based on the indication of the best SSB or the best CSI-RS.

In one configuration, at 930, the UE may configure the first MOs of the USS set to align with updated second MOs of an updated CSS set based on the best SSB or the best CSI-RS. For example, 930 may be performed by the PDCCH configuration component 1140 in FIG. 11. Referring to FIG. 7, at 738, the UE 702 may configure the first MOs of the USS set to align with updated second MOs of an updated CSS set based on the best SSB or the best CSI-RS.

In one configuration, the PDCCH MOs may occur once every M slots, where M>1.

Figure 10:
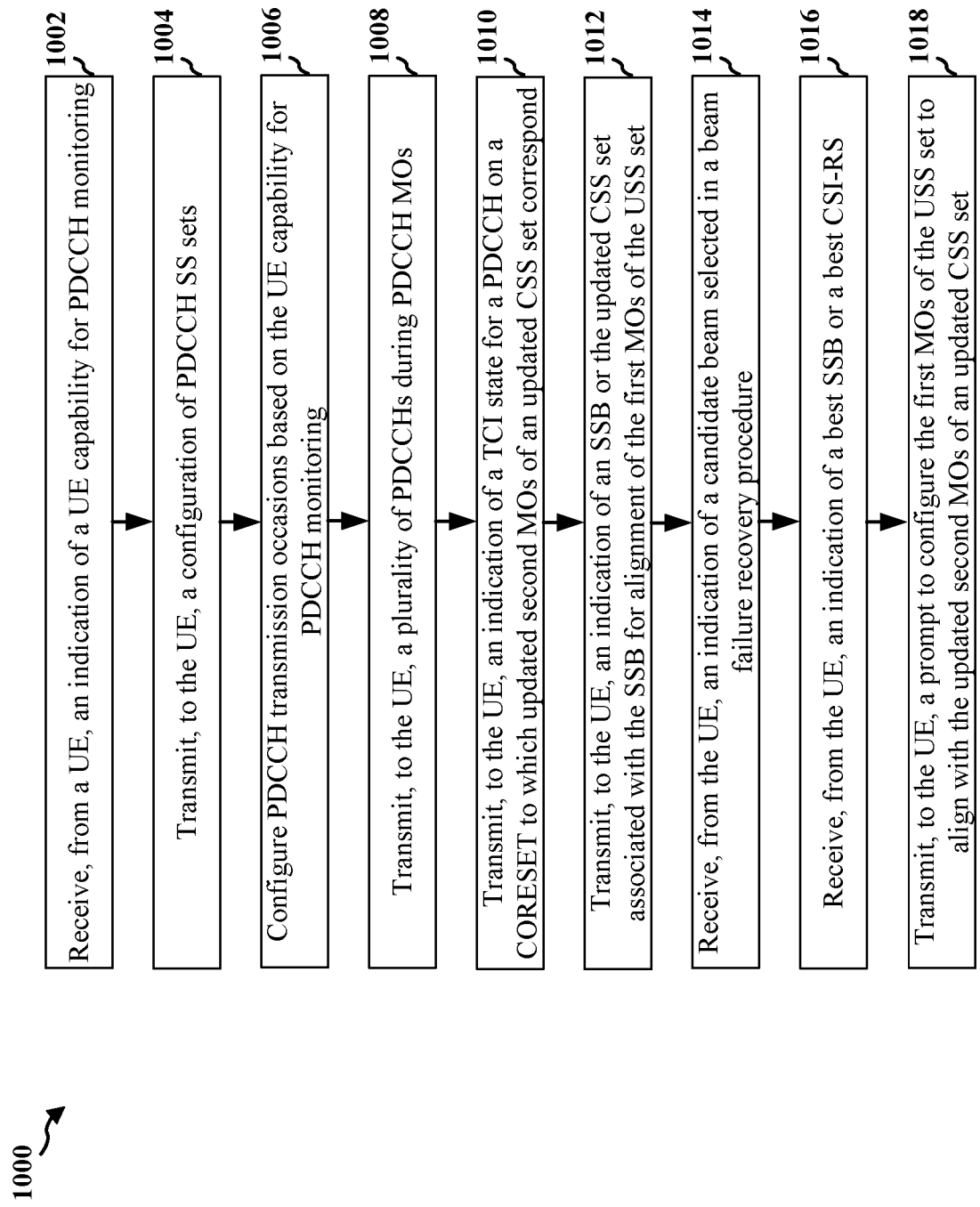
FIG. 10 is a flowchart of a method of wireless communication.

FIG. 10 is a flowchart 1000 of a method of wireless communication. The method may be performed by a base station (e.g., the base station 102/180/310/704; the apparatus 1202). At 1002, the base station may receive, from a UE, an indication of a UE capability for PDCCH monitoring. For example, 1002 may be performed by the PDCCH configuration component 1240 in FIG. 12. Referring to FIG. 7, at 706, the base station 704 may receive, from a UE 702, an indication of a UE capability for PDCCH monitoring.

At 1004, the base station may transmit to the UE, a configuration of PDCCH search space sets for the UE based on the UE capability for PDCCH monitoring. For example, 1004 may be performed by the PDCCH configuration component 1240 in FIG. 12. Referring to FIG. 7, at 708, the base station 704 may transmit to the UE 702, a configuration of PDCCH search space sets for the UE 702 based on the UE capability for PDCCH monitoring.

At 1006, the base station may configure PDCCH transmission occasions based on the UE capability for PDCCH monitoring. For example, 1006 may be performed by the PDCCH configuration component 1240 in FIG. 12. Referring to FIG. 7, at 714, the base station 704 may configure PDCCH transmission occasions based on the UE capability for PDCCH monitoring.

At 1008, the base station may transmit, to the UE, a plurality of PDCCHs during PDCCH MOs. The PDCCH MOs may correspond to first MOs of a USS set or second MOs of a CSS set. The first MOs of the USS set may be aligned with the second MOs of the CSS set. For example, 1008 may be performed by the PDCCH configuration component 1240 in FIG. 12. Referring to FIG. 7, at 716, the base station 704 may transmit, to the UE 702, a plurality of PDCCHs during PDCCH MOs.

In one configuration, the first MOs of the USS set may be adjusted dynamically to be in same slots as the second MOs of the CSS set, or to be within a predefined range of the second MOs of the CSS set.

In one configuration, the first MOs of the USS set may correspond to same CORESETs as the second MOs of the CSS, or to CORESETs that are different from but overlap in time with CORESETs to which the second MOs of the CSS set correspond.

In one configuration, at 1010, the base station may transmit, to the UE, an indication of a TCI state for a PDCCH on a CORESET to which updated second MOs of an updated CSS set correspond. For example, 1010 may be performed by the PDCCH configuration component 1240 in FIG. 12. Referring to FIG. 7, at 718, the base station 704 may transmit, to the UE 702, an indication of a TCI state for a PDCCH on a CORESET to which updated second MOs of an updated CSS set correspond.

In one configuration, the indication may be transmitted via a MAC-CE.

In one configuration, the indication may be associated with an adjustment of at least one parameter of CORESETs to which the first MOs of the USS set correspond to align the first MOs of the USS set with the updated second MOs of the updated CSS set.

In one configuration, the TCI state may include a QCL-TypeD parameter. A source RS of the TCI state may be an SSB. The first MOs of the USS may be aligned with the updated second MOs of the updated CSS set associated with the SSB.

In one configuration, the TCI state may include a QCL-TypeD parameter. A source RS of the TCI state may not be an SSB. The first MOs of the USS may be aligned with the updated second MOs of the updated CSS set associated with an SSB QCL'ed with the source RS of the TCI state.

In one configuration, at 1012, the base station may transmit, to the UE, an indication of an SSB or the updated CSS set associated with the SSB for alignment of the first MOs of the USS set. The first MOs of the USS set may be aligned with the updated second MOs of the updated CSS set based on the indication of the SSB or the updated CSS set associated with the SSB. For example, 1012 may be performed by the PDCCH configuration component 1240 in FIG. 12. Referring to FIG. 7, at 722, the base station 704 may transmit, to the UE 702, an indication of an SSB or the updated CSS set associated with the SSB for alignment of the first MOs of the USS set.

In one configuration, at 1014, the base station may receive, from the UE, an indication of a candidate beam selected in a beam failure recovery procedure. Third MOs of an RSS set may be aligned with updated second MOs of a CSS set associated with the candidate beam. For example, 1014 may be performed by the PDCCH configuration component 1240 in FIG. 12. Referring to FIG. 7, at 726, the base station 704 may receive, from the UE 702, an indication of a candidate beam selected in a beam failure recovery procedure.

In one configuration, at 1016, the base station may receive, from the UE, an indication of a best SSB or a best CSI-RS. The best SSB or the best CSI-RS may be based on a measurement of at least one SSB or at least one CSI-RS. For example, 1016 may be performed by the PDCCH configuration component 1240 in FIG. 12. Referring to FIG. 7, at 734, the base station 704 may receive, from the UE 702, an indication of a best SSB or a best CSI-RS.

In one configuration, at 1018, the base station may transmit, to the UE, a prompt to configure the first MOs of the USS set to align with updated second MOs of an updated CSS set based on the indication of the best SSB or the best CSI-RS. For example, 1018 may be performed by the PDCCH configuration component 1240 in FIG. 12. Referring to FIG. 7, at 736, the base station may transmit, to the UE, a prompt to configure the first MOs of the USS set to align with updated second MOs of an updated CSS set based on the indication of the best SSB or the best CSI-RS.

In one configuration, the first MOs of the USS set may be aligned with updated second MOs of an updated CSS set based on the best SSB or the best CSI-RS.

In one configuration, the PDCCH MOs may occur once every M slots, where M>1.

Figure 11:
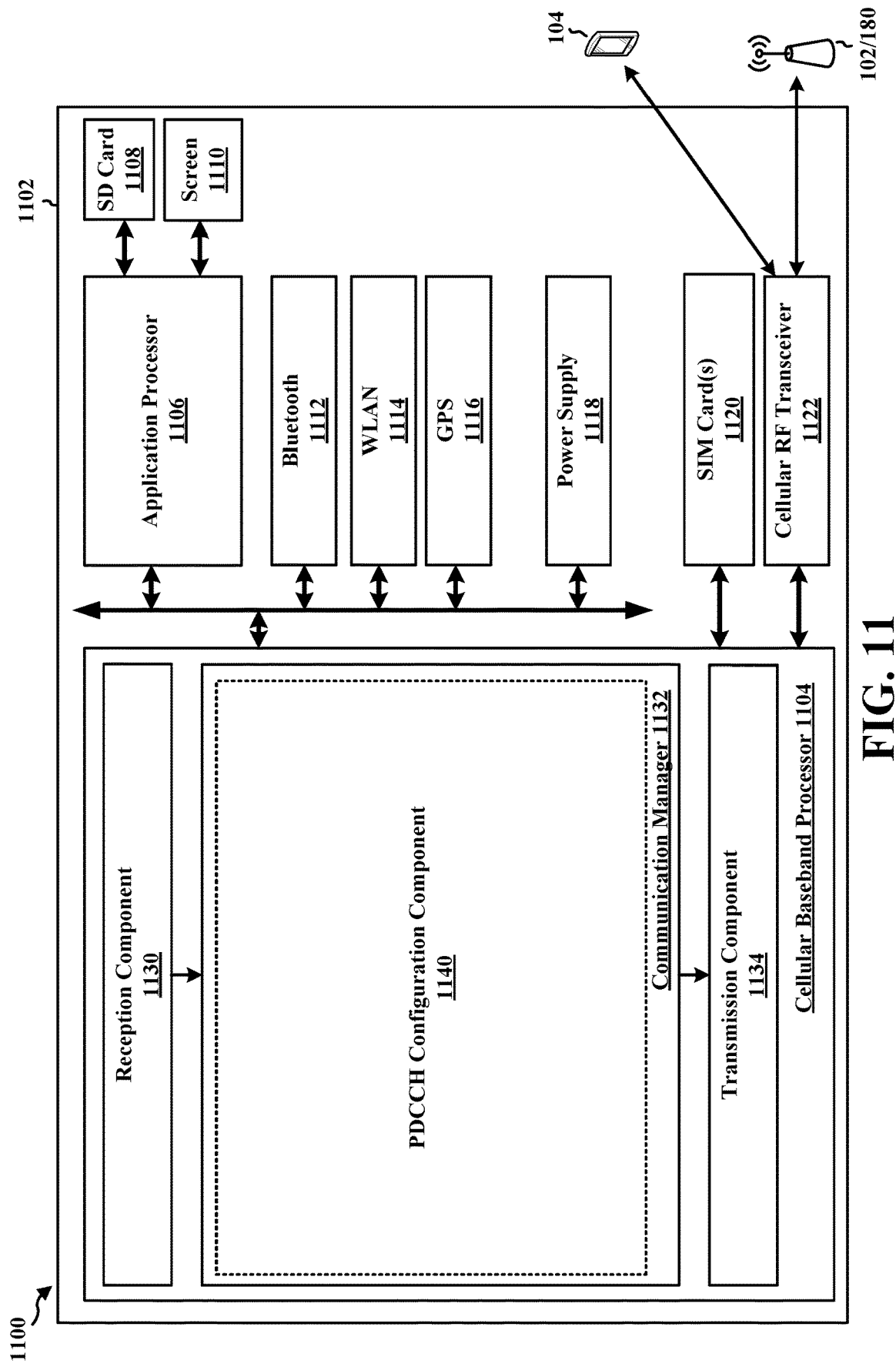
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS)

module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a PDCCH configuration component 1140 that may be configured to transmit, to a base station, an indication of a UE capability for PDCCH monitoring, e.g., as described in connection with 902 in FIG. 9. The PDCCH configuration component 1140 may be configured to receive, from the base station, a configuration of search space sets based on the UE capability, e.g., as described in connection with 904 in FIG. 9. The PDCCH configuration component 1140 may be configured to configure, based on the UE capability for PDCCH monitoring, first MOs of a USS set to align with second MOs of a CSS set, e.g., as described in connection with 906 in FIG. 9. The PDCCH configuration component 1140 may be configured to monitor, based on the configuration, for a plurality of PDCCHs during PDCCH MOs, e.g., as described in connection with 908 in FIG. 9. The PDCCH configuration component 1140 may be configured to receive, from the base station, a plurality of PDCCHs during PDCCH MOs, e.g., as described in connection with 910 in FIG. 9. The PDCCH configuration component 1140 may be configured to receive, from the base station, an indication of a TCI state for a PDCCH on a CORESET to which updated second MOs of an updated CSS set correspond, e.g., as described in connection with 912 in FIG. 9. The PDCCH configuration component 1140 may be configured to align the first MOs of the USS set with the updated second MOs of the updated CSS set associated with an SSB, e.g., as described in connection with 914a in FIG. 9. The PDCCH configuration component 1140 may be configured to align the first MOs of the USS set with the updated second MOs of the updated CSS set associated with an SSB QCL'ed with a source RS of the TCI state, e.g., as described in connection with 914b in FIG. 9. The PDCCH configuration component 1140 may be configured to receive, from the base station, an indication of SSB or the updated CSS set associated with the SSB for alignment of the first MOs of the USS set, e.g., as described in connection with 914c in FIG. 9. The PDCCH configuration component 1140 may be configured to align the first MOs of the USS set with the updated second MOs of the updated CSS set associated with the SSB based on the indication of the SSB or the updated CSS set associated with the SSB, e.g., as described in connection with 914d in FIG. 9. The PDCCH configuration component 1140 may be configured to select a candidate beam in a beam failure recovery procedure, e.g., as described in connection with 916 in FIG. 9. The PDCCH configuration component 1140 may be configured to transmit an indication of the candidate beam to the base station, e.g., as described in connection with 918 in FIG. 9. The PDCCH configuration component 1140 may be configured to configure third MOs of an RSS set to align with updated second MOs of a CSS set associated with the candidate beam, e.g., as described in connection with 920 in FIG. 9. The PDCCH configuration component 1140 may be configured to measure at least one SSB or at least one CSI-RS, e.g., as described in connection with 922 in FIG. 9. The PDCCH configuration component 1140 may be configured to determine a best SSB or a best CSI-RS based on the measurement, e.g., as described in connection with 924 in FIG. 9. The PDCCH configuration component 1140 may be configured to transmit, to the base station, an indication of the best SSB or the best CSI-RS, e.g., as described in connection with 926 in FIG. 9. The PDCCH configuration component 1140 may be configured to receive, from the base station, a prompt to configure the first MOs of the USS set to align with updated second MOs of an updated CSS set based on the indication of the best SSB or the best CSI-RS, e.g., as described in connection with 928 in FIG. 9. The PDCCH configuration component 1140 may be configured to configure the first MOs of the USS set to align with updated second MOs of an updated CSS set based on the best SSB or the best CSI-RS, e.g., as described in connection with 930 in FIG. 9.

The apparatus may include additional components that perform each of the blocks of the algorithm in the aforementioned flowcharts of FIGS. 7 and 9. As such, each block in the aforementioned flowcharts of FIGS. 7 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for transmitting, to a base station, an indication of a UE capability for PDCCH monitoring. The apparatus 1102 may include means for configuring, based on the UE capability for PDCCH monitoring, first MOs of a USS set to align with second MOs of a CSS set. The apparatus 1102 may include means for monitoring, based on the configuration, for a plurality of PDCCHs during PDCCH MOs. The PDCCH MOs may correspond to the first MOs or the second MOs.

In one configuration, the first MOs of the USS set may be adjusted dynamically to be in same slots as the second MOs of the CSS set, or to be within a predefined range of the second MOs of the CSS set. In one configuration, the first MOs of the USS set may correspond to same CORESETs as the second MOs of the CSS, or to CORESETs that are different from but overlap in time with CORESETs to which the second MOs of the CSS set correspond. In one configuration, the apparatus 1102 may further include means for receiving, from the base station, an indication of a TCI state for a PDCCH on a CORESET to which updated second MOs of an updated CSS set correspond. In one configuration, the indication may be received via a MAC-CE. In one configuration, the indication may prompt the UE to adjust at least one parameter of CORESETs to which the first MOs of the USS set correspond or at least one parameter of the USS set to align the first MOs of the USS set with the updated second MOs of the updated CSS set. In one configuration, the apparatus 1102 may further include means for aligning the first MOs of the USS set with the updated second MOs of the updated CSS set associated with an SSB. The first MOs of the USS set may be aligned with the updated second MOs of the updated CSS set in response to the TCI state including a QCL-TypeD parameter and a source RS of the TCI state being the SSB. In one configuration, the apparatus 1102 may further include means for aligning the first MOs of the USS set with the updated second MOs of the updated CSS set associated with an SSB QCL'ed with a source RS of the TCI state. The first MOs of the USS set may be aligned with the updated second MOs of the updated CSS set in response to the TCI state including a QCL-TypeD parameter and the source RS of the TCI state not being an SSB. In one configuration, the apparatus 1102 may further include means for receiving, from the base station, an indication of SSB or the updated CSS set associated with the SSB for alignment of the first MOs of the USS set. The apparatus 1102 may further include means for aligning the first MOs of the USS set with the updated second MOs of the updated CSS set associated with the SSB based on the indication of the SSB or the updated CSS set associated with the SSB. In one configuration, the apparatus 1102 may further include means for selecting a candidate beam in a beam failure recovery procedure. The apparatus 1102 may further include means for transmitting an indication of the candidate beam to the base station. The apparatus 1102 may further include means for configuring third MOs of an RSS set to align with updated second MOs of a CSS set associated with the candidate beam. In one configuration, the apparatus 1102 may further include means for measuring at least one SSB or at least one CSI-RS. The apparatus 1102 may further include means for determining a best SSB or a best CSI-RS based on the measurement. The apparatus 1102 may further include means for transmitting, to the base station, an indication of the best SSB or the best CSI-RS. In one configuration, the apparatus 1102 may further include means for receiving, from the base station, a prompt to configure the first MOs of the USS set to align with updated second MOs of an updated CSS set based on the indication of the best SSB or the best CSI-RS. In one configuration, the apparatus 1102 may further include means for configuring the first MOs of the USS set to align with updated second MOs of an updated CSS set based on the best SSB or the best CSI-RS. In one configuration, the PDCCH MOs may occur once every M slots, where M>1.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
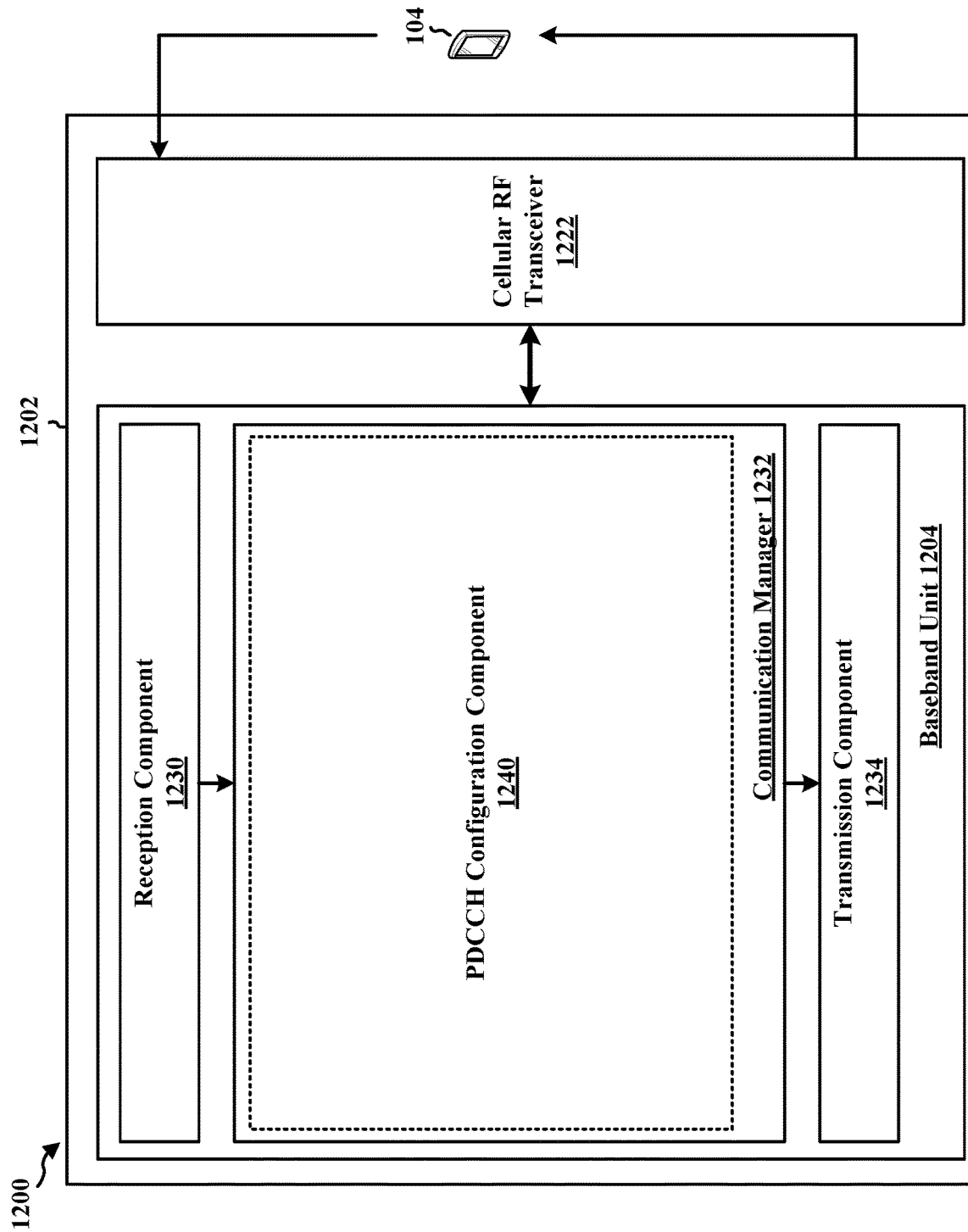
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a PDCCH configuration component 1240 that may be configured to receive, from a UE, an indication of a UE capability for PDCCH monitoring, e.g., as described in connection with 1002 in FIG. 10. The PDCCH configuration component 1240 may be configured to transmit, to the UE, a configuration of search space sets based on the UE capability, e.g., as described in connection with 1004 in FIG. 10. The PDCCH configuration component 1240 may be configured to configure PDCCH transmission occasions based on the UE capability for PDCCH monitoring, e.g., as described in connection with 1006 in FIG. 10. The PDCCH configuration component 1240 may be configured to transmit, to the UE, a plurality of PDCCHs during PDCCH MOs, e.g., as described in connection with 1008 in FIG. 10. The PDCCH configuration component 1240 may be configured to transmit, to the UE, an indication of a TCI state for a PDCCH on a CORESET to which updated second MOs of an updated CSS set correspond, e.g., as described in connection with 1010 in FIG. 10. The PDCCH configuration component 1240 may be configured to transmit, to the UE, an indication of an SSB or the updated CSS set associated with the SSB for alignment of the first MOs of the USS set, e.g., as described in connection with 1012 in FIG. 10. The PDCCH configuration component 1240 may be configured to receive, from the UE, an indication of a candidate beam selected in a beam failure recovery procedure, e.g., as described in connection with 1014 in FIG. 10. The PDCCH configuration component 1240 may be configured to receive, from the UE, an indication of a best SSB or a best CSI-RS, e.g., as described in connection with 1016 in FIG. 10. The PDCCH configuration component 1240 may be configured to transmit, to the UE, a prompt to configure the first MOs of the USS set to align with updated second MOs of an updated CSS set based on the indication of the best SSB or the best CSI-RS, e.g., as described in connection with 1018 in FIG. 10.

The apparatus may include additional components that perform each of the blocks of the algorithm in the aforementioned flowcharts of FIGS. 7 and 10. As such, each block in the aforementioned flowcharts of FIGS. 7 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for receiving, from a UE, an indication of a UE capability for PDCCH monitoring. The apparatus 1202 may include means for configuring PDCCH transmission occasions based on the UE capability for PDCCH monitoring. The apparatus 1202 may include means for transmitting, to the UE, a plurality of PDCCHs during PDCCH MOs. The PDCCH MOs may correspond to first MOs of a USS set or second MOs of a CSS set. The first MOs of the USS set may be aligned with the second MOs of the CSS set.

In one configuration, the first MOs of the USS set may be adjusted dynamically to be in same slots as the second MOs of the CSS set, or to be within a predefined range of the second MOs of the CSS set. In one configuration, the first MOs of the USS set may correspond to same CORESETs as the second MOs of the CSS, or to CORESETs that are different from but overlap in time with CORESETs to which the second MOs of the CSS set correspond. In one configuration, the apparatus 1202 may further include means for transmitting, to the UE, an indication of a TCI state for a PDCCH on a CORESET to which updated second MOs of an updated CSS set correspond. In one configuration, the indication may be transmitted via a MAC-CE. In one configuration, the indication may be associated with an adjustment of at least one parameter of CORESETs to which the first MOs of the USS set correspond to align the first MOs of the USS set with the updated second MOs of the updated CSS set. In one configuration, the TCI state may include a QCL-TypeD parameter. A source RS of the TCI state may be an SSB. The first MOs of the USS may be aligned with the updated second MOs of the updated CSS set associated with the SSB. In one configuration, the TCI state may include a QCL-TypeD parameter. A source RS of the TCI state may not be an SSB. The first MOs of the USS may be aligned with the updated second MOs of the updated CSS set associated with an SSB QCL'ed with the source RS of the TCI state. In one configuration, the apparatus 1202 may further include means for transmitting, to the UE, an indication of an SSB or the updated CSS set associated with the SSB for alignment of the first MOs of the USS set. The first MOs of the USS set may be aligned with the updated second MOs of the updated CSS set based on the indication of the SSB or the updated CSS set associated with the SSB. In one configuration, the apparatus 1202 may further include means for receiving, from the UE, an indication of a candidate beam selected in a beam failure recovery procedure. Third MOs of an RSS set may be aligned with updated second MOs of a CSS set associated with the candidate beam. In one configuration, the apparatus 1202 may further include means for receiving, from the UE, an indication of a best SSB or a best CSI-RS. The best SSB or the best CSI-RS may be based on a measurement of at least one SSB or at least one CSI-RS. In one configuration, the apparatus 1202 may further include means for transmitting, to the UE, a prompt to configure the first MOs of the USS set to align with updated second MOs of an updated CSS set based on the indication of the best SSB or the best CSI-RS. In one configuration, the first MOs of the USS set are aligned with updated second MOs of an updated CSS set based on the best SSB or the best CSI-RS. In one configuration, the PDCCH MOs may occur once every M slots, where M>1.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

According to aspects described above, the UE may transmit, to a base station, an indication of a UE capability for PDCCH monitoring. The UE may configure, based on the UE capability for PDCCH monitoring, first MOs of a USS set to align with second MOs of a CSS set. The UE may monitor, based on the configuration, for a plurality of PDCCHs during PDCCH MOs. The PDCCH MOs may correspond to the first MOs or the second MOs. The first MOs of the USS set may be adjusted dynamically to be in same slots as the second MOs of the CSS set, or to be within a predefined range of the second MOs of the CSS set. Because the first MOs of the USS set are aligned with the second MOs of the CSS set, the number of slots during which the UE may need to monitor for the PDCCH may be reduced, and power may be saved as a result.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, including: transmitting, to a base station, an indication of a UE capability for PDCCH monitoring; configuring, based on the UE capability for PDCCH monitoring, first MOs of a USS set to align with second MOs of a CSS set; and monitoring, based on the configuration, for a plurality of PDCCHs during PDCCH MOs, the PDCCH MOs corresponding to the first MOs or the second MOs.

Aspect 2 is the method of aspect 1, where the first MOs of the USS set are adjusted dynamically to be in same slots as the second MOs of the CSS set, or to be within a predefined range of the second MOs of the CSS set.

Aspect 3 is the method of any of aspects 1 and 2, where the first MOs of the USS set correspond to same CORESETs as the second MOs of the CSS, or to CORESETs that are different from but overlap in time with CORESETs to which the second MOs of the CSS set correspond.

Aspect 4 is the method of any of aspects 1 to 3, further including: receiving, from the base station, an indication of a TCI state for a PDCCH on a CORESET to which updated second MOs of an updated CSS set correspond.

Aspect 5 is the method of aspect 4, where the indication is received via a MAC-CE.

Aspect 6 is the method of aspect 4, where the indication prompts the UE to adjust at least one parameter of CORESETs to which the first MOs of the USS set correspond or at least one parameter of the USS set to align the first MOs of the USS set with the updated second MOs of the updated CSS set.

Aspect 7 is the method of any of aspects 4 to 6, further including: aligning the first MOs of the USS set with the updated second MOs of the updated CSS set associated with an SSB, where the first MOs of the USS set are aligned with the updated second MOs of the updated CSS set in response to the TCI state including a QCL-TypeD parameter and a source RS of the TCI state being the SSB.

Aspect 8 is the method of any of aspects 4 to 6, further including: aligning the first MOs of the USS set with the updated second MOs of the updated CSS set associated with an SSB QCL'ed with a source RS of the TCI state, where the first MOs of the USS set are aligned with the updated second MOs of the updated CSS set in response to the TCI state including a QCL-TypeD parameter and the source RS of the TCI state not being an SSB.

Aspect 9 is the method of any of aspects 4 to 6, where the TCI state does not include a QCL-TypeD parameter, and the method further includes: receiving, from the base station, an indication of SSB or the updated CSS set associated with the SSB for alignment of the first MOs of the USS set; and aligning the first MOs of the USS set with the updated second MOs of the updated CSS set associated with the SSB based on the indication of the SSB or the updated CSS set associated with the SSB.

Aspect 10 is the method of any of aspects 1 to 3, further including: selecting a candidate beam in a beam failure recovery procedure; transmitting an indication of the candidate beam to the base station; and configuring third MOs of an RSS set to align with updated second MOs of a CSS set associated with the candidate beam.

Aspect 11 is the method of any of aspects 1 to 3, further including: measuring at least one SSB or at least one CSI-RS; determining a best SSB or a best CSI-RS based on the measurement; and transmitting, to the base station, an indication of the best SSB or the best CSI-RS.

Aspect 12 is the method of aspect 11, further including: receiving, from the base station, a prompt to configure the first MOs of the USS set to align with updated second MOs of an updated CSS set based on the indication of the best SSB or the best CSI-RS.

Aspect 13 is the method of any of aspects 11 and 12, further including: configuring the first MOs of the USS set to align with updated second MOs of an updated CSS set based on the best SSB or the best CSI-RS.

Aspect 14 is the method of any of aspects 1 to 13, where the PDCCH MOs occur once every M slots, where M>1.

Aspect 15 is a method of wireless communication at a base station, including: receiving, from a UE, an indication of a UE capability for PDCCH monitoring; configuring PDCCH transmission occasions based on the UE capability for PDCCH monitoring; and transmitting, to the UE, a plurality of PDCCHs during PDCCH MOs, the PDCCH MOs corresponding to first MOs of a USS set or second MOs of a CSS set, the first MOs of the USS set being aligned with the second MOs of the CSS set.

Aspect 16 is the method of aspect 15, where the first MOs of the USS set are adjusted dynamically to be in same slots as the second MOs of the CSS set, or to be within a predefined range of the second MOs of the CSS set.

Aspect 17 is the method of any of aspects 15 and 16, where the first MOs of the USS set correspond to same CORESETs as the second MOs of the CSS, or to CORESETs that are different from but overlap in time with CORESETs to which the second MOs of the CSS set correspond.

Aspect 18 is the method of any of aspects 15 to 17, further including: transmitting, to the UE, an indication of a TCI state for a PDCCH on a CORESET to which updated second MOs of an updated CSS set correspond.

Aspect 19 is the method of aspect 18, where the indication is transmitted via a MAC-CE.

Aspect 20 is the method of aspect 18, where the indication is associated with an adjustment of at least one parameter of CORESETs to which the first MOs of the USS set correspond to align the first MOs of the USS set with the updated second MOs of the updated CSS set.

Aspect 21 is the method of any of aspects 18 to 20, where the TCI state includes a QCL-TypeD parameter, a source RS of the TCI state is an SSB, and the first MOs of the USS are aligned with the updated second MOs of the updated CSS set associated with the SSB.

Aspect 22 is the method of any of aspects 18 to 20, where the TCI state includes a QCL-TypeD parameter, a source RS of the TCI state is not an SSB, and the first MOs of the USS are aligned with the updated second MOs of the updated CSS set associated with an SSB QCL'ed with the source RS of the TCI state.

Aspect 23 is the method of any of aspects 18 to 20, further including: transmitting, to the UE, an indication of an SSB or the updated CSS set associated with the SSB for alignment of the first MOs of the USS set, where the first MOs of the USS set are aligned with the updated second MOs of the updated CSS set based on the indication of the SSB or the updated CSS set associated with the SSB.

Aspect 24 is the method of any of aspects 15 to 17, further including: receiving, from the UE, an indication of a candidate beam selected in a beam failure recovery procedure, where third MOs of an RSS set are aligned with updated second MOs of a CSS set associated with the candidate beam.

Aspect 25 is the method of any of aspects 15 to 17, further including: receiving, from the UE, an indication of a best SSB or a best CSI-RS, the best SSB or the best CSI-RS being based on a measurement of at least one SSB or at least one CSI-RS.

Aspect 26 is the method of aspect 25, further including: transmitting, to the UE, a prompt to configure the first MOs of the USS set to align with updated second MOs of an updated CSS set based on the indication of the best SSB or the best CSI-RS.

Aspect 27 is the method of any of aspects 25 and 26, where the first MOs of the USS set are aligned with updated second MOs of an updated CSS set based on the best SSB or the best CSI-RS.

Aspect 28 is the method of any of aspects 15 to 27, where the PDCCH MOs occur once every M slots, where M>1.

Aspect 29 is an apparatus for wireless communication including at least one processor coupled to a memory and configured to implement a method as in any of aspects 1 to 28.

Aspect 30 is an apparatus for wireless communication including means for implementing a method as in any of aspects 1 to 28.

Aspect 31 is a computer-readable medium storing computer executable code, where the code when executed by a processor causes the processor to implement a method as in any of aspects 1 to 28.

What is claimed is:

1. An apparatus for wireless communication at a user equipment (UE), comprising a memory, and one or more processors coupled to the memory and configured to:
   transmit an indication of a UE capability for physical downlink control channel (PDCCH) monitoring;
   configure, based on the UE capability for PDCCH monitoring, first monitoring occasions (MOs) of a UE-specific search space (USS) set to align with second MOs of a common search space (CSS) set; and
   monitor, based on the configuration of the first MOs of the USS set to align with the second MOs of the CSS set, for a plurality of PDCCHs during PDCCH MOs, PDCCH MOs corresponding to the first MOs or the second MOs,
   wherein the first MOs of the USS set are adjusted dynamically to be in same slots as the second MOs of the CSS set, or to be within a predefined range of the second MOs of the CSS set.

2. An apparatus for wireless communication at a user equipment (UE), comprising a memory, and one or more processors coupled to the memory and configured to:
   transmit an indication of a UE capability for physical downlink control channel (PDCCH) monitoring;
   configure, based on the UE capability for PDCCH monitoring, first monitoring occasions (MOs) of a UE-specific search space (USS) set to align with second MOs of a common search space (CSS) set; and
   monitor, based on the configuration of the first MOs of the USS set to align with the second MOs of the CSS set, for a plurality of PDCCHs during PDCCH MOs, PDCCH MOs corresponding to the first MOs or the second MOs,
   wherein the at least one processor is further configured to:
      receive an indication of a transmission configuration indicator (TCI) state for a PDCCH on a control resource set (CORESET) to which updated second MOs of an updated CSS set correspond,
      wherein the indication prompts the UE to adjust at least one parameter of CORESETs to which the first MOs of the USS set correspond or at least one parameter of the USS set to align the first MOs of the USS set with the updated second MOs of the updated CSS set, and
   wherein the at least one processor is further configured to:
      align the first MOs of the USS set with the updated second MOs of the updated CSS set associated with a synchronization signal block (SSB), wherein the first MOs of the USS set are aligned with the updated second MOs of the updated CSS set in response to the TCI state including a quasi co-location (QCL)-TypeD parameter and a source reference signal (RS) of the TCI state being the SSB; or
      align the first MOs of the USS set with the updated second MOs of the updated CSS set associated with a synchronization signal block (SSB) quasi co-located (QCL'ed) with a source reference signal (RS) of the TCI state, wherein the first MOs of the USS set are aligned with the updated second MOs of the updated CSS set in response to the TCI state including the quasi co-location (QCL)-TypeD parameter and the source RS of the TCI state not being the SSB; or
      receive an indication of a synchronization signal block (SSB) or the updated CSS set associated with the SSB for alignment of the first MOs of the USS set, and align the first MOs of the USS set with the updated second MOs of the updated CSS set associated with the SSB based on the indication of the SSB or the updated CSS set associated with the SSB, wherein the TCI state does not include the quasi co-location (QCL)-TypeD parameter.

3. The apparatus of claim 2, wherein the at least one processor is configured to:
   align the first MOs of the USS set with the updated second MOs of the updated CSS set associated with the synchronization signal block (SSB), wherein the first MOs of the USS set are aligned with the updated second MOs of the updated CSS set in response to the TCI state including the quasi co-location (QCL)-TypeD parameter and the source reference signal (RS) of the TCI state being the SSB.

4. The apparatus of claim 2, wherein the at least one processor is configured to:
   align the first MOs of the USS set with the updated second MOs of the updated CSS set associated with the synchronization signal block (SSB) quasi co-located (QCL'ed) with the source reference signal (RS) of the TCI state, wherein the first MOs of the USS set are aligned with the updated second MOs of the updated CSS set in response to the TCI state including the quasi co-location (QCL)-TypeD parameter and the source RS of the TCI state not being the SSB.

5. The apparatus of claim 2, wherein the TCI state does not include the quasi co-location (QCL)-TypeD parameter, and the at least one processor is configured to:
  receive an indication of the synchronization signal block (SSB) or the updated CSS set associated with the SSB for alignment of the first MOs of the USS set; and
  align the first MOs of the USS set with the updated second MOs of the updated CSS set associated with the SSB based on the indication of the SSB or the updated CSS set associated with the SSB.

6. An apparatus for wireless communication at a user equipment (UE), comprising a memory, and one or more processors coupled to the memory and configured to:
  transmit an indication of a UE capability for physical downlink control channel (PDCCH) monitoring;
  configure, based on the UE capability for PDCCH monitoring, first monitoring occasions (MOs) of a UE-specific search space (USS) set to align with second MOs of a common search space (CSS) set; and
  monitor, based on the configuration of the first MOs of the USS set to align with the second MOs of the CSS set, for a plurality of PDCCHs during PDCCH MOs, PDCCH MOs corresponding to the first MOs or the second MOs,
  wherein the at least one processor is further configured to:
    select a candidate beam in a beam failure recovery procedure;
    transmit an indication of the candidate beam; and
    configure third MOs of a recovery search space (RSS) set to align with updated second MOs of a CSS set associated with the candidate beam.

7. An apparatus for wireless communication at a user equipment (UE), comprising a memory, and one or more processors coupled to the memory and configured to:
  transmit an indication of a UE capability for physical downlink control channel (PDCCH) monitoring;
  configure, based on the UE capability for PDCCH monitoring, first monitoring occasions (MOs) of a UE-specific search space (USS) set to align with second MOs of a common search space (CSS) set; and
  monitor, based on the configuration of the first MOs of the USS set to align with the second MOs of the CSS set, for a plurality of PDCCHs during PDCCH MOs, PDCCH MOs corresponding to the first MOs or the second MOs,
  wherein the at least one processor is further configured to:
    measure at least one synchronization signal block (SSB) or at least one channel state information (CSI)-reference signal (RS) (CSI-RS);
    determine a best SSB or a best CSI-RS based on the measurement; and
    transmit an indication of the best SSB or the best CSI-RS,
  wherein the at least one processor is further configured to:
    receive a prompt to configure the first MOs of the USS set to align with updated second MOs of an updated CSS set based on the indication of the best SSB or the best CSI-RS; or
    configure the first MOs of the USS set to align with the updated second MOs of the updated CSS set based on the best SSB or the best CSI-RS.

8. The apparatus of claim 7, wherein the at least one processor is configured to:
  receive the prompt to configure the first MOs of the USS set to align with the updated second MOs of the updated CSS set based on the indication of the best SSB or the best CSI-RS.

9. The apparatus of claim 7, wherein the at least one processor is configured to:
  configure the first MOs of the USS set to align with the updated second MOs of the updated CSS set based on the best SSB or the best CSI-RS.

* * * * *